(12) United States Patent
Williams et al.

(10) Patent No.: US 7,273,549 B2
(45) Date of Patent: Sep. 25, 2007

(54) MEMBRANE CONTACTOR APPARATUS INCLUDING A MODULE HAVING HOLLOW FIBER MEMBRANES

(75) Inventors: Dennis Williams, Altadena, CA (US); Mark Williams, Long Beach, CA (US)

(73) Assignee: Geoscience Support Services Inc., Upland, CA (US)

( * ) Notice: Subject to any disclaimer, the term of this patent is extended or adjusted under 35 U.S.C. 154(b) by 338 days.

(21) Appl. No.: 10/764,058

(22) Filed: Jan. 23, 2004

(65) Prior Publication Data
US 2005/0161388 A1    Jul. 28, 2005

(51) Int. Cl.
*B01D 63/04* (2006.01)
(52) U.S. Cl. .......................... 210/209; 96/8; 210/321.8; 210/321.81; 210/321.89; 210/321.9
(58) Field of Classification Search ................ 210/321.79–321.81, 321.88–321.9, 435, 210/500.23, 640, 644; 96/6–12
See application file for complete search history.

(56) References Cited
U.S. PATENT DOCUMENTS

| | | | | |
|---|---|---|---|---|
| 3,612,282 A | * | 10/1971 | Cheng | .................. 210/321.89 |
| 3,923,664 A | * | 12/1975 | Grover et al. | ........... 210/321.9 |
| 5,034,125 A | * | 7/1991 | Karbachsch et al. | ...... 210/321.8 |
| 5,071,552 A | * | 12/1991 | Bikson et al. | ........... 210/321.8 |
| 5,104,535 A | * | 4/1992 | Cote et al. | ................ 210/321.8 |
| 5,176,725 A | * | 1/1993 | Puri et al. | ......................... 96/8 |
| 5,352,361 A | * | 10/1994 | Prasad et al. | ........... 210/321.81 |
| 5,470,469 A | * | 11/1995 | Eckman | .................... 210/321.8 |
| 6,402,818 B1 | | 6/2002 | Sengupta | .......................... 96/6 |
| 6,503,225 B1 | | 1/2003 | Kirsch et al. | ................ 604/126 |

* cited by examiner

*Primary Examiner*—Joseph Drodge
(74) *Attorney, Agent, or Firm*—Sheppard, Mullin, Richter & Hampton LLP

(57) ABSTRACT

An apparatus including a first hollow fiber membrane module, baffle assembly, and fluid source. The module includes a plurality of elongated hollow fiber membranes located generally in adjacent, parallel relationship to each other. Each of the membranes includes a generally cylindrical wall having a first end and a second end. The module also includes a module housing that supports the membranes. The module is configured to be positionable within the conduit and further to be matable with a similarly configured module. The baffle assembly is located within the conduit and configured to direct the flow of a first fluid through the module. The fluid source directs a second fluid to flow through the membranes from the first end to the second end. A predetermined substance is transmitted through the membranes' walls, to modify the concentration of the predetermined substance in the first fluid.

25 Claims, 14 Drawing Sheets

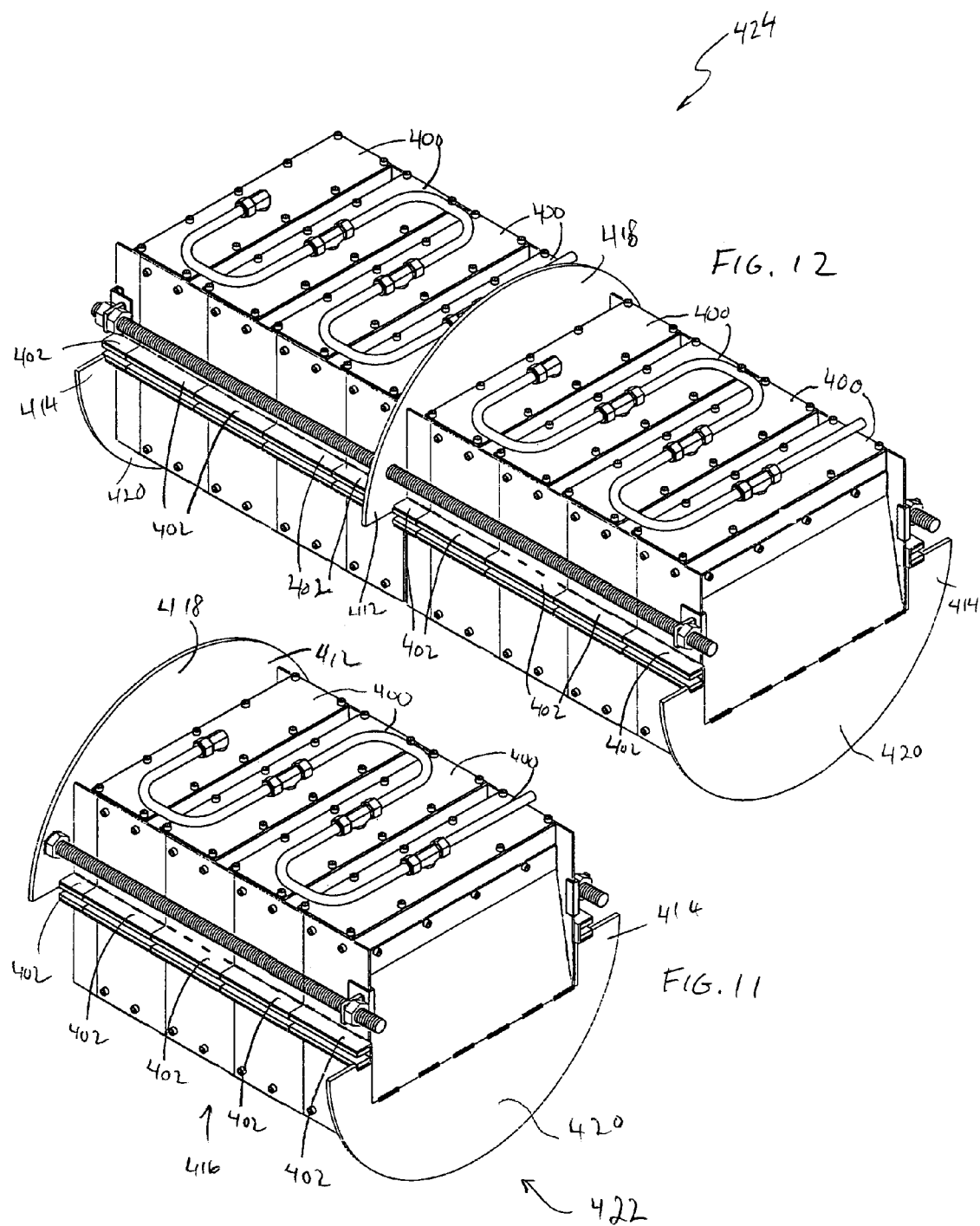

MEMBRANE CONTACTOR APPARATUS INCLUDING A MODULE HAVING HOLLOW FIBER MEMBRANES

FIELD OF THE INVENTION

The invention relates generally to the field of membrane contactors. More specifically, the invention relates to membrane contactors including a module having hollow fiber membranes.

BACKGROUND OF THE INVENTION

Membrane contactors including hollow fiber membranes are used in many industries to modify the concentration of a predetermined substance in a fluid (i.e., a liquid or a gas). The hollow fiber membranes are porous hollow fibers, which selectively allow for the transfer of molecules through the wall of the hollow fiber membrane. The transfer of the molecules through the wall of the hollow fiber membrane is facilitated by a chemical concentration gradient between a fluid inside of the hollow fiber membrane and a fluid outside of the hollow fiber membrane. Because the membrane contactor facilitates the transfer of molecules through the wall of the hollow fiber membrane, the membrane contactor is said to bring about "contact" between the fluid inside of the hollow fiber membrane and the fluid outside of the hollow fiber membrane.

Since hollow fiber membranes allow only molecules of a predetermined substance to pass through the hollow fiber membrane, they can be used to separate molecules from various materials. In fact, different hollow fiber membranes are used for different applications because the characteristics of the hollow fiber membrane affect the number and type of molecules that can be selected.

One example of the use of membrane contactors including hollow fiber membranes is in the process of removing dissolved gases (e.g., $O_2$ and $N_2$) from water. During the gas-removal process, water containing dissolved gas flows past the outside ("shellside") of the hollow fiber membranes. A vacuum or sweep gas (e.g., $N_2$) is maintained in the inside ("lumen") of the hollow fiber membranes. The concentration gradient between the water outside of the hollow fiber membranes and the vacuum or gas inside of the hollow fiber membranes results in the transfer of dissolved gases, from the liquid phase to the gas phase, through the walls of the hollow fiber membranes.

Hollow fiber membranes are advantageous in that they allow for the transfer of molecules between fluids inside and outside of the hollow fiber membranes while maintaining physical separation of the two respective phases. Also, hollow fiber membranes offer a large surface area over which the transfer of molecules can occur. However, existing membrane contactors provide relatively low flow capacity, typically between 1 and 200 gallons per minute, and thus, do not offer the economy of scale needed for large-scale applications. Also, existing membrane contactors are expensive to fabricate, have a low tolerance for turbid water, and are difficult to clean and maintain. Accordingly, there is a need for a membrane contactor that facilitates high-flow capacity, provides for economy of scale, and is easy to clean and maintain. The present invention satisfies this need.

SUMMARY OF THE INVENTION

An exemplary system that embodies the invention is an apparatus for modifying the concentration of a predetermined substance present in a first fluid flowing through a conduit having an inner surface, the apparatus including a first hollow fiber membrane module, baffle assembly, and fluid source. The first hollow fiber membrane module includes a plurality of elongated hollow fiber membranes located generally in adjacent, parallel relationship to each other. Each of the hollow fiber membranes includes a generally cylindrical wall defining an interior surface and an exterior surface, and further defining a first end and a second end. Each of the cylindrical walls is configured to transmit the predetermined substance therethrough, between its interior surface and its exterior surface. The first hollow fiber membrane module also includes a module housing that supports the plurality of elongated hollow fiber membranes with their first ends arranged in adjacent relationship, and with their second ends arranged in adjacent relationship. A transverse flow path is defined past the exterior surfaces of the hollow fiber membranes. The first hollow fiber membrane module is configured to be positionable within the conduit and further to be matable with a similarly configured hollow fiber membrane module. The baffle assembly is located within the conduit and configured to direct the flow of the first fluid through the first hollow fiber membrane module, along the transverse flow path past the exterior surfaces of the plurality of elongated hollow fiber membranes. The fluid source directs a second fluid to flow through the plurality of elongated hollow fiber membranes, from their first ends to their second ends. The predetermined substance is transmitted through the cylindrical walls of the plurality of elongated hollow fiber membranes, to modify the concentration of the predetermined substance in the first fluid.

In other, more detailed features of the invention, the apparatus further comprises a second hollow fiber membrane module, which is substantially similar to the first hollow fiber membrane module and located within the conduit, adjacent to the first hollow fiber membrane module. The fluid source further directs the second fluid to flow through the plurality of elongated hollow fiber membranes of the second hollow fiber membrane module, from their first ends to their second ends. The baffle assembly is configured to direct the first fluid, to flow first through the first hollow fiber membrane, and then through the second hollow fiber membrane module, along the transverse flow path past the exterior surfaces of the plurality of elongated hollow fiber membranes of the second hollow fiber membrane module.

In other, more detailed features of the invention, the module housing includes a first membrane housing, first end plate, second membrane housing, second end plate, and first side support. The first membrane housing is located adjacent to the first ends of the hollow fiber membranes and is coupled to the first ends of the hollow fiber membranes. The first end plate is located adjacent to the first ends of the hollow fiber membranes and is connected to the first membrane housing. The second membrane housing is located adjacent to the second ends of the hollow fiber membranes and is coupled to the second ends of the hollow fiber membranes. The second end plate is located adjacent to the second ends of the hollow fiber membranes and is connected to the second membrane housing. The first side support is connected between the first membrane housing and the second membrane housing, and maintains a position of the first membrane housing relative to the second membrane housing.

In other, more detailed features of the invention, the apparatus also includes a second side support connected between the first and second membrane housings. In addition, the hollow fiber membranes are made of a substance selected from the group including polypropylene, polyvinylidene flouride, and Teflon®. A material, selected from the group including epoxy, silicon, and urethane, fills spaces between the first ends of the hollow fiber membranes, couples the first ends of the hollow fiber membranes to the first membrane housing, fills other spaces between the second ends of the hollow fiber membranes, and couples the second ends of the hollow fiber membranes to the second membrane housing. Furthermore, the apparatus includes first and second O-rings. The first O-ring is positioned between the first membrane housing and the first end plate before the first end plate is secured to the first membrane housing. Similarly, the second O-ring is positioned between the second membrane housing and the second end plate before the second end plate is secured to the second membrane housing. The first and second O-rings provide first and second seals, respectively, between the first membrane housing and the first end plate, and the second membrane housing and the second end plate, respectively. First and second tube fittings are connected to the first and second end plates, respectively.

In other, more detailed features of the invention, the apparatus also includes a flow divider connected to the first membrane housing, which directs the flow of the first fluid after the first fluid flows past the hollow fiber membranes. The flow divider includes a plurality of flow vanes. The conduit is a cylindrical pipe. A module guide is connected to the flow divider, and a module guide runner is connected to the module guide. The conduit includes a rib connected to the inner surface, and the module guide interfaces with the rib.

In other, more detailed features of the invention, the apparatus includes an input flow diversion assembly, and output flow diversion assembly. The input flow diversion assembly is located adjacent to the first hollow fiber membrane module and is configured to direct the flow of the first fluid into the first hollow fiber membrane module. The output flow diversion assembly is located adjacent to the first hollow fiber membrane module, with the first hollow fiber membrane module located between the input flow diversion assembly and the output flow diversion assembly. The output flow diversion assembly is configured to direct the flow of the first fluid leaving the first hollow fiber membrane module. The input flow diversion assembly includes an upper portion, the output flow diversion assembly includes a lower portion, and both the upper and lower portions are designed to interface with the inner surface of the conduit.

In another exemplary system that embodies the invention, the apparatus includes a first stage and an adjacent second stage through which the first fluid flows, wherein each of the first and second stages includes a hollow fiber membrane module. A first flow diversion assembly is located within the conduit between the first and second stages and is configured to direct the flow of the first fluid into the first stage and direct the flow of the first fluid leaving the second stage. A second flow diversion assembly is located within the conduit adjacent to the first stage, with the first stage located between the first flow diversion assembly and the second flow diversion assembly. The second flow diversion assembly is configured to direct the flow of the first fluid leaving the first stage. The third flow diversion assembly is located within the conduit and adjacent to the second stage, with the second stage located between the first flow diversion assembly and the third diversion assembly. The third flow diversion assembly is configured to direct the flow of the substance into the second stage.

In other, more detailed features of the invention, the first flow diversion assembly includes an upper portion, each of the second and third flow diversion assemblies includes a lower portion, and the upper and lower portions are designed to interface with the inner surface of the conduit. A module guide is connected to the hollow fiber membrane module in each of the first and second stages.

In another exemplary system that embodies the invention, the apparatus includes a plurality of modules configured to be placed in a contiguous relationship within the conduit. In other, more detailed features of the invention, one module of the plurality of modules further includes a flow divider connected to the first membrane housing that directs a flow of the first fluid after the first fluid flows past the hollow fiber membranes of the one hollow fiber membrane module. The apparatus also includes a first flow diversion assembly and a second flow diversion assembly. The first flow diversion assembly is located adjacent to the plurality of hollow fiber membrane modules and is configured to direct the flow of the first fluid into the plurality of hollow fiber membrane modules. The second flow diversion assembly is located adjacent to the plurality of hollow fiber membrane modules, with the plurality of hollow fiber membrane modules located between the first flow diversion assembly and the second flow diversion assembly. The second flow diversion assembly is configured to direct the flow of the first fluid leaving the plurality of hollow fiber membrane modules.

An exemplary method that embodies the invention is a method for fabricating a hollow fiber membrane module used in a conduit. The method includes providing the plurality of elongated hollow fiber membranes, first and second membrane housings, first and second end plates, a first side support, and a material. The method also includes potting the first ends of the plurality of elongated hollow fiber membranes in the first membrane housing with the material, potting the second ends of the plurality of elongated hollow fiber membranes in the second membrane housing with the material, connecting the first side support between the first and second membrane housings, connecting the first end plate to the first membrane housing, and connecting the second end plate to the second membrane housing.

In other, more detailed features of the invention, the method further includes providing a second side support, and connecting the second side support between the first and second membrane housings. Also, the method includes providing first and second O-rings, positioning the first O-ring between the first membrane housing and the first end plate before the first end plate is secured to the first membrane housing, and positioning the second O-ring between the second membrane housing and the second end plate before the second end plate is secured to the second membrane housing. In addition, the method includes providing first and second tube fittings, connecting the first tube fitting to the first end plate, and connecting the second tube fitting to the second end plate. Furthermore, the method includes providing a flow divider, and connecting the flow divider to the first membrane housing.

Other features of the invention should become apparent from the following description of the preferred embodiments taken in conjunction with the accompanying drawings, which illustrate, by way of example, the principles of the invention.

BRIEF DESCRIPTION OF THE DRAWINGS

FIG. 11 is a perspective drawing illustrating a single-stage membrane contactor including four hollow fiber membrane modules having module guides.

FIG. 12 is a perspective drawing illustrating a double-stage membrane contactor including eight hollow fiber membrane modules having module guides.

DETAILED DESCRIPTION OF THE PREFERRED EMBODIMENTS

The invention is embodied in hollow fiber membrane modules, each of which includes a plurality of elongated hollow fiber membranes. The plurality of elongated hollow fiber membranes has a large surface area, and can be used to modify the concentration of a predetermined substance present in a first fluid flowing through a conduit. The hollow fiber membrane modules can be reconfigured to meet different requirements, can be used directly in-line with existing processing systems, and are inexpensive to manufacture and clean.

Figure 1:
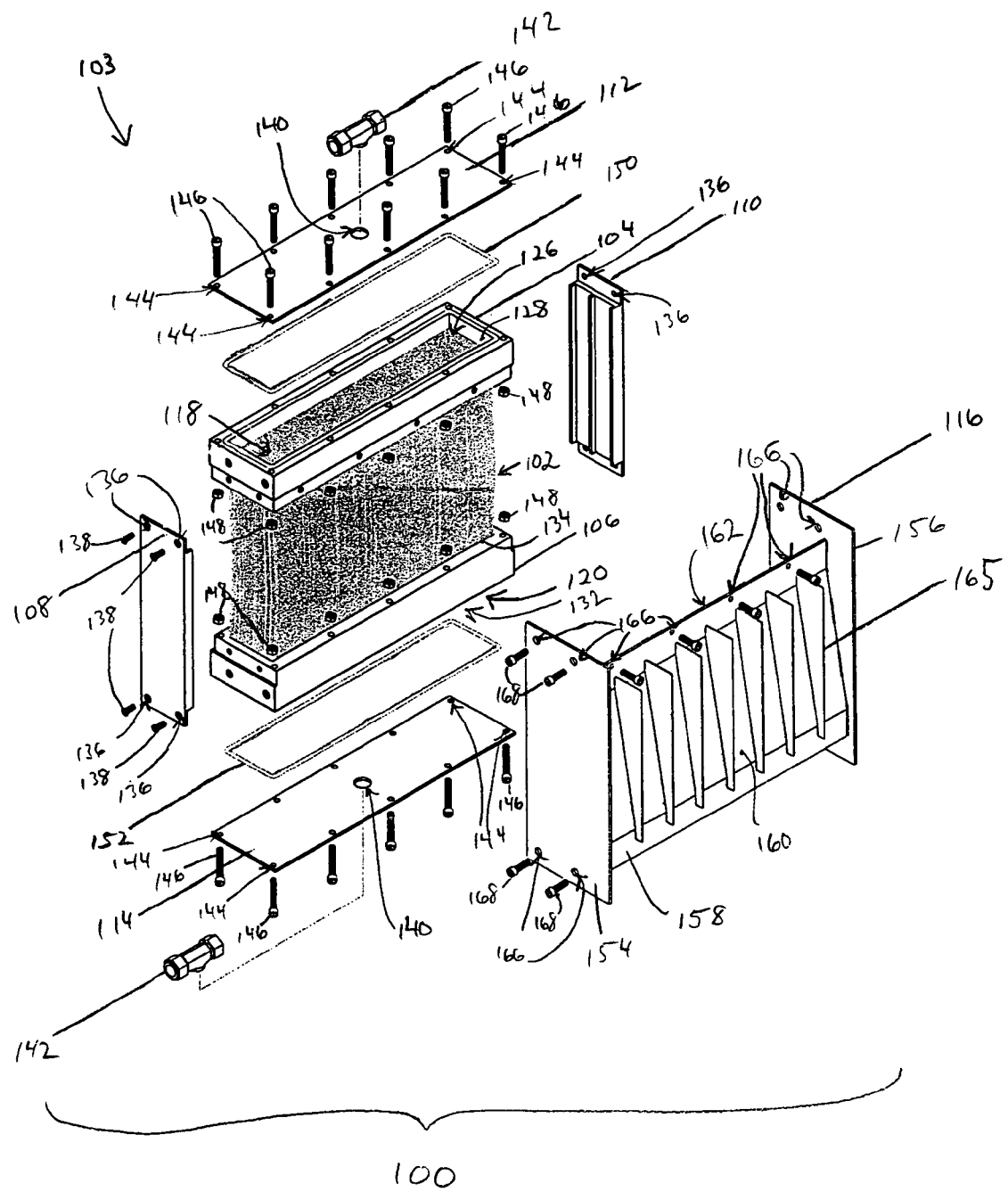
FIG. 1 is an exploded perspective drawing illustrating a preferred embodiment of a hollow fiber membrane module.
Figure 2:
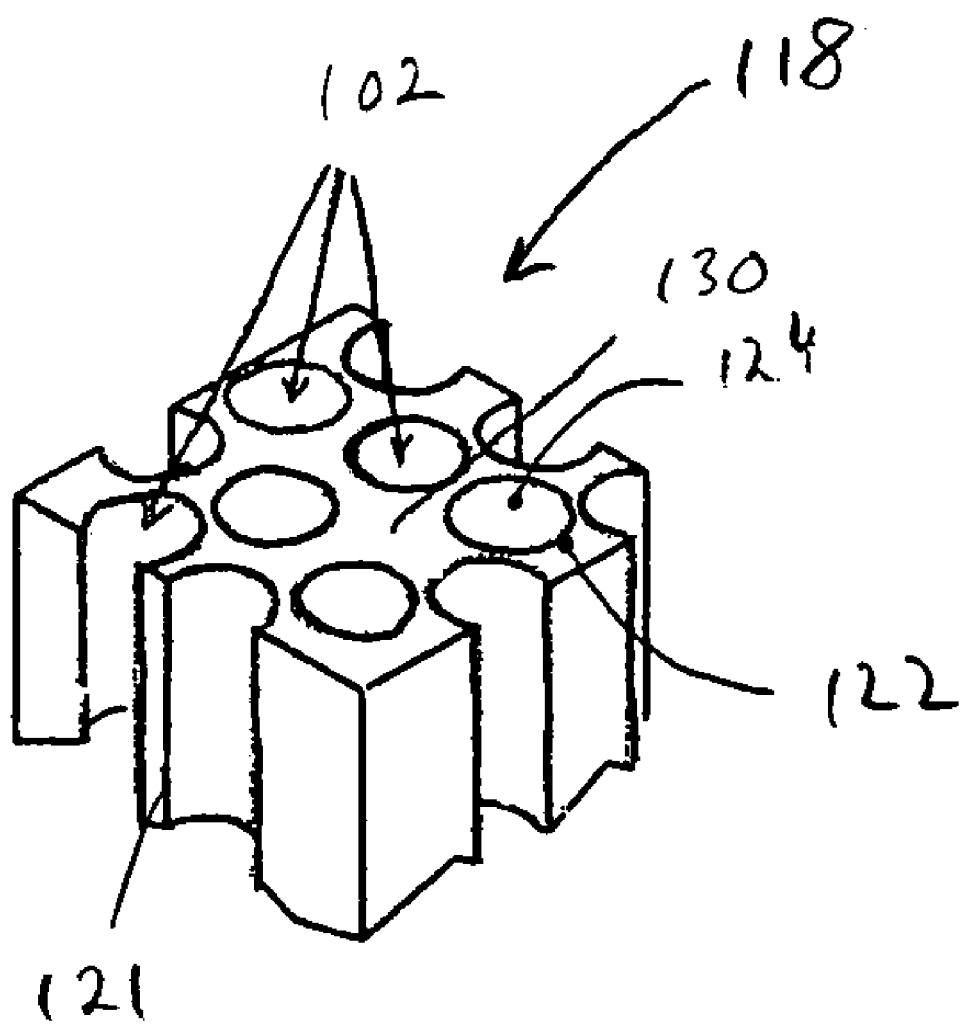
FIG. 2 is a perspective drawing illustrating a magnified section of the potted hollow fiber membrane ends of the module depicted in FIG. 1.

FIG. 1 is an exploded perspective drawing illustrating a preferred embodiment of a hollow fiber membrane module 100 used in a membrane contactor. The module includes a plurality of elongated hollow fiber membranes 102 and a module housing 103, which includes a first membrane housing 104, a second membrane housing 106, a first side support 108, a second side support 110, a first end plate 112, a second end plate 114, and a flow divider 116. The hollow fiber membranes included in the plurality of elongated hollow fiber membranes are located in an adjacent and parallel relationship to one another. Referring additionally to FIG. 2, which is a perspective view of one end 118 of a portion of the plurality of elongated hollow fiber membranes, each of the hollow fiber membranes has a first end 118, an opposite second end 120, and a cylindrical wall 121, which defines an exterior surface 122 and an interior surface 124. The hollow fiber membranes are porous hollow fibers having a mean pore diameter generally less than approximately 0.05 micrometers. The outside diameters of each hollow fiber membrane range from approximately 0.3 millimeters to approximately 1.5 millimeters. The hollow fiber membranes are made of a hydrophobic material such as polypropylene, polyvinylidene flouride (PVDF; Kynar®) or any of the materials under the Teflon® trademark. The walls of the hollow fiber membranes are configured to transmit a predetermined substance, e.g., a fluid, therethrough between the interior and exterior surfaces of the cylindrical walls as the first fluid (not shown) flows past the hollow fiber membranes, so as to modify the concentration of the predetermined substance in the first fluid.

The shape of both the first and second membrane housings 104 and 106, respectively, is that of a rectangular ring. The first and second membrane housings may be made of polypropylene, nylon, polyvinylchloride (PVC), Teflon, or Kynar®, depending upon the application. The first membrane housing 104 includes a first opening 126 having a first interior surface 128 within which the first end 118 of each of the hollow fiber membranes 102 is located in an adjacent relationship and potted in a material 130, which can be a resin or an elastomer, e.g., epoxy, silicon, or urethane, as shown in FIG. 2. Correspondingly, the second membrane housing 106 includes a second opening 132 having a second interior surface 134 within which the second end 120 of each of the hollow fiber membranes is located in an adjacent relationship and potted in the material. Thus, the first membrane housing is located adjacent to the first ends of the hollow fiber membranes, and the second membrane housing is located adjacent to the second ends of the hollow fiber membranes.

The material 130 fills the voids between adjacent ends 118 or 120 of the hollow fiber membranes 102. The material also couples the first and second ends of the hollow fiber membranes to the interior surfaces 128 and 134 of the first and second openings in the first and second membrane housings, respectively. Thus, the first ends 118 of the hollow fiber membranes are coupled to the first membrane housing 104 and the second ends 120 of the hollow fiber membranes are coupled to the second membrane housing 106.

The first and second side supports 108 and 110, respectively, are both rectangular in shape and may be made of polypropylene, Delrin, stainless steel, or PVC. Each of the first and second side supports include four holes 136 through which screws 138 are inserted when the first and second side supports are connected to the first and second membrane housings 104 and 106, respectively. Once connected to the first and second membrane housings, the first and second side supports help to maintain a position of the first membrane housing relative to the second membrane housing, and thus, provide support for the plurality of elongated hollow fiber membranes 102.

Each of the first and second end plates 112 and 114, respectively, has a rectangular shape and includes a centrally-located fitting hole 140 into which a tube fitting 142 is secured. The end plates may be made of stainless steel, steel, or PVC. Also, each of the first and second end plates includes ten holes 144 through which bolts 146 are inserted when the first and second end plates are connected to the first and second membrane housings 104 and 106, respectively.

Figure 3:
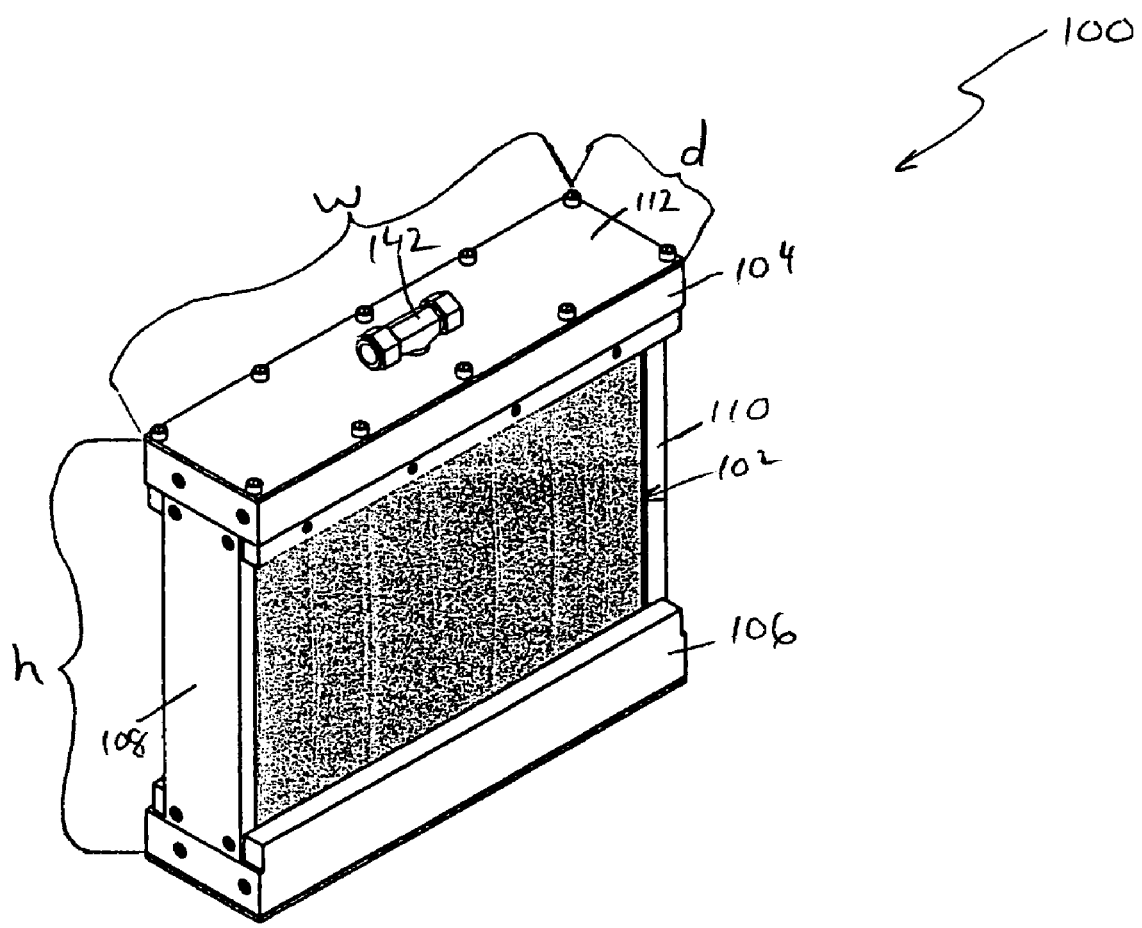
FIG. 3 is a perspective drawing illustrating the module of FIG. 1 without a flow divider.

Nuts 148 interface with the bolts and are used to secure the first and second end plates to the first and second membrane housings, respectively. As shown in FIGS. 1 and 3, the first and second end plates are located adjacent to the first and second ends 118 and 120, respectively, after the first and second end plates are secured to the first and second membrane housings, respectively. A first O-ring 150 is positioned between the first membrane housing and the first end plate, and a second O-ring 152 is positioned between the second membrane housing and the second end plate before the two end plates are secured to the membrane housings. The first O-ring provides a first seal between the first membrane housing and the first end plate, and the second O-ring provides a second seal between the second membrane housing and the second end plate. Each O-ring may be made of Viton®.

Figure 4:
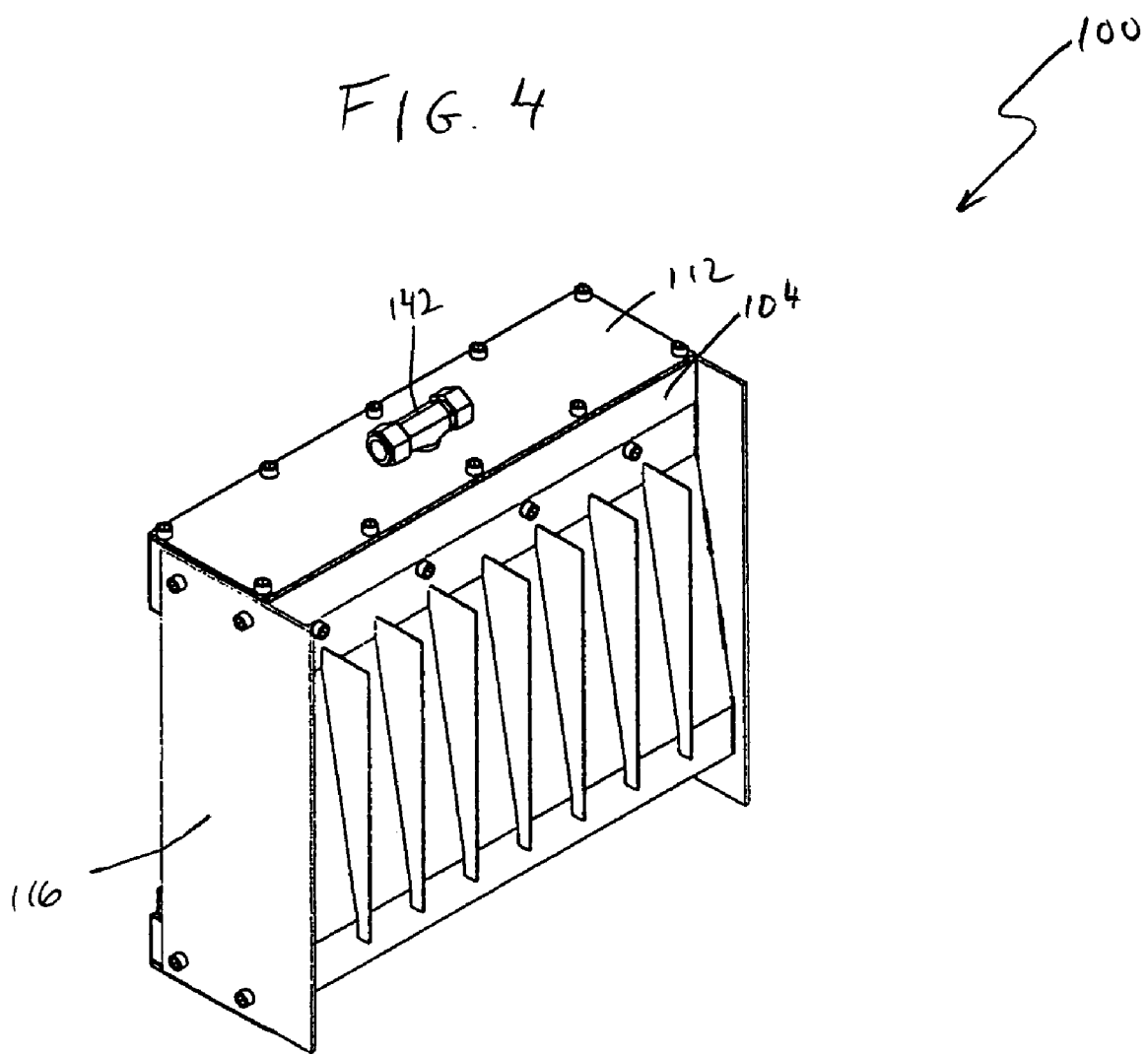
FIG. 4 is a perspective drawing illustrating the module of FIG. 1 connected to a flow divider.

The flow divider 116 is used for directing the flow of the substance after the substance flows along a transverse path past the exterior surfaces 122 of the hollow fiber membranes 102. The flow divider may be made of stainless steel or PVC, and has a first plate 154, second plate 156, and an interface piece 158. The first and second plates are rectangular in shape and are held relatively parallel to one another by the interface piece, which is connected perpendicularly between the first and second plates. The interface piece has opposite slopping surfaces 162 and 164 (only one shown) to which seven triangular flow vanes 165 are connected. The first plate, second plate, and interface piece each have four holes 166 through which screws 168 are inserted when the flow divider is connected to the first and second membrane housings 104 and 106, respectively. The width w, height h, and depth d of the module are indicated in FIG. 3, which is a perspective drawing of the assembled module without the flow divider. FIG. 4 is a perspective drawing of the assembled module including the flow divider.

Figure 5:
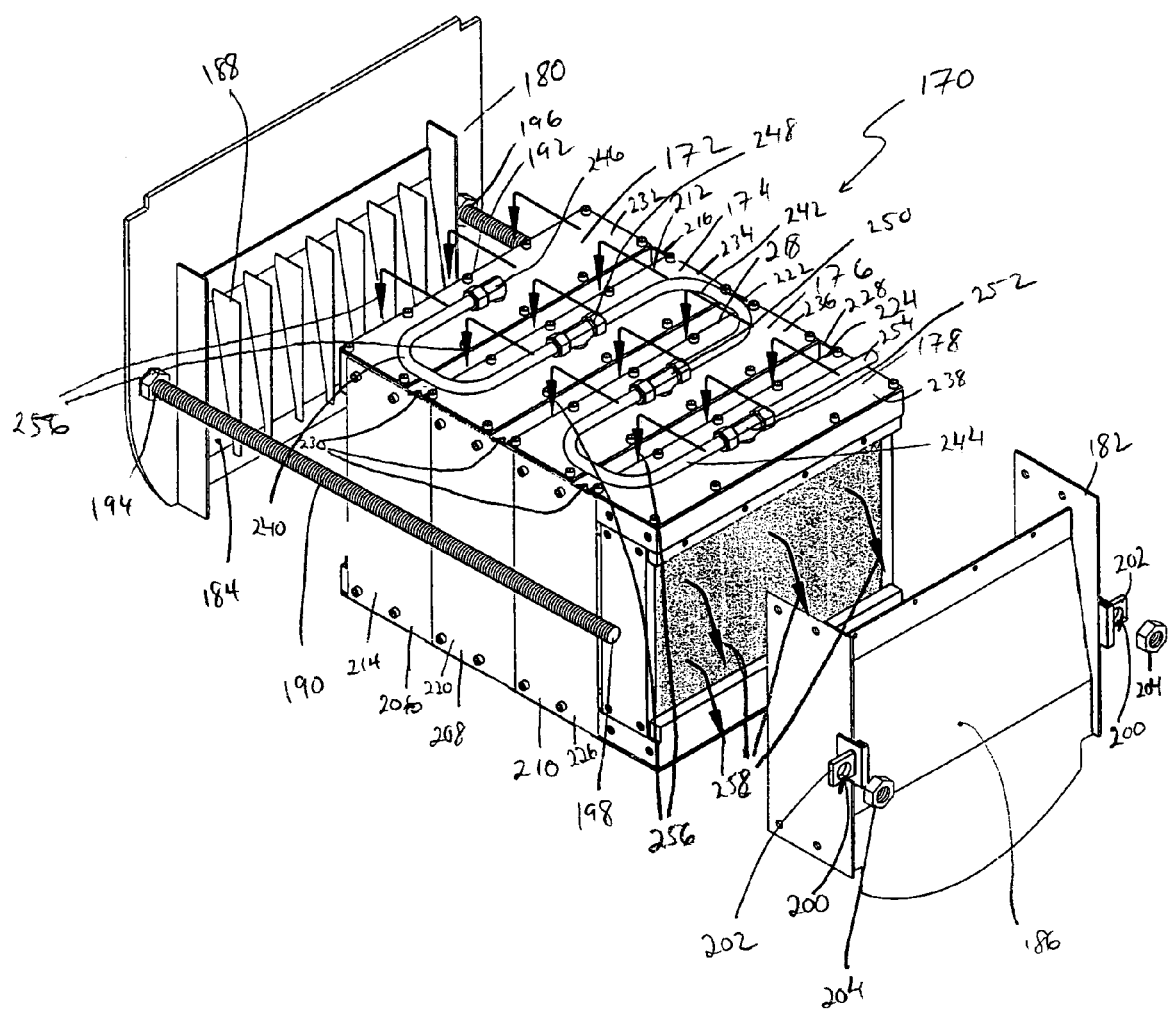
FIG. 5 is a partially-exploded perspective drawing illustrating a single-stage membrane contactor including four hollow fiber membrane modules.

One or more modules 100 may be configured in a matable, contiguous relationship in a stage 170 as shown in FIG. 5, which is a partially-exploded perspective drawing illustrating a stage containing four series-connected modules 172, 174, 176, and 178. The four modules are located between an input flow diversion assembly 180 and an output flow diversion assembly 182. The input and output flow diversion assemblies comprise a baffle assembly that directs the flow of the first fluid (not shown) through the module and may be made of stainless steel and PVC. Both the input and output flow diversion assemblies, similar to the flow divider 116, include a sloped surface 184 and 186, respectively, to which seven flow vanes 188 are connected. Two bolts 190 and 192 each have one end 194 and 196, respectively, connected to the input flow diversion assembly. The opposite end 198 (only one shown) of each bolt is inserted through a hole 200 in a bracket 202, which is connected to the output flow diversion assembly, and secured in place with a nut 204. Thus, the input and output flow diversion assemblies are coupled to one another. The input flow diversion assembly is configured to direct the flow of the substance into the four modules. In contrast, the output flow diversion assembly is configured to direct the flow of the substance leaving the four modules.

As depicted in FIG. 5, flow dividers 206, 208, and 210 are connected to each of the first, second, and third modules 172, 174, and 176, respectively. One edge 212 of the second module is inserted between the first and second plates 214 and 216, respectively, of the first module's flow divider 206. Similarly, one edge 218 of the third module 210 is inserted between the first and second plates 220 and 222, respectively, of the second module's flow divider 208. Also, one edge 224 of the fourth module 176 is inserted between the first and second plates 226 and 228, respectively, of the third module's flow divider 210. Because of the position of the flow vanes 188 connected to the input flow diversion assembly 180, and the first, second, and third modules' flow dividers, a first rectangular opening 230 is located adjacent to each of the first end plates 232, 234, 236, and 238, of the first, second, third, and fourth modules 172, 174, 176, and 178, respectively. Also, because of the flow vanes (not shown) connected to the output flow diversion assembly 182 and the first, second, and third modules' flow dividers, a second rectangular opening (not shown) is located adjacent to each of the second end plates (not shown).

First, second, and third pipes 240, 242, and 244, respectively, interconnect the tube fittings 246, 248, 250, and 252 secured to the first end plates 232, 234, 236, and 238 of the first, second, third, and fourth modules 172, 174, 176, and 178, respectively. A fourth pipe 254 is shown extending away from the tube fitting 252 connected to the first end plate of the fourth module. While not shown in FIG. 5, additional pipes (not shown) interconnect the tube fittings (not shown) secured to the second end plates (not shown) of the first, second, third, and fourth modules.

Referring additionally to FIGS. 1 and 2, in operation, the first fluid (not shown) flows over the first end plates 232-238 of the modules 172-178 and down through the first rectangular openings 230 as indicated by arrows 256. The first fluid then enters the modules and flows transversely past the exterior surfaces 122 of the hollow fiber membranes 102. The first fluid then exits the modules by flowing down through the second rectangular openings (not shown) as indicated by the arrows 258. While the first fluid flows through the modules, a second fluid (not shown) provided by a fluid source (not shown) flows through the pipes 240-244 and 254 and tube fittings 246-252 connected to the first end plates. The second fluid then flows down through the first membrane housing 104 and into the plurality of elongated hollow fiber membranes. After flowing through the plurality of elongated hollow fiber membranes, the second fluid flows through the second membrane housing 106 and tube fittings (not shown) connected to the second end plates 114 and the additional pipes (not shown). The hollow fiber membranes allow for the transfer of a predetermined substance through the wall 125 of each hollow fiber membrane depending upon the concentration gradient between the first and second fluids.

Figure 6:
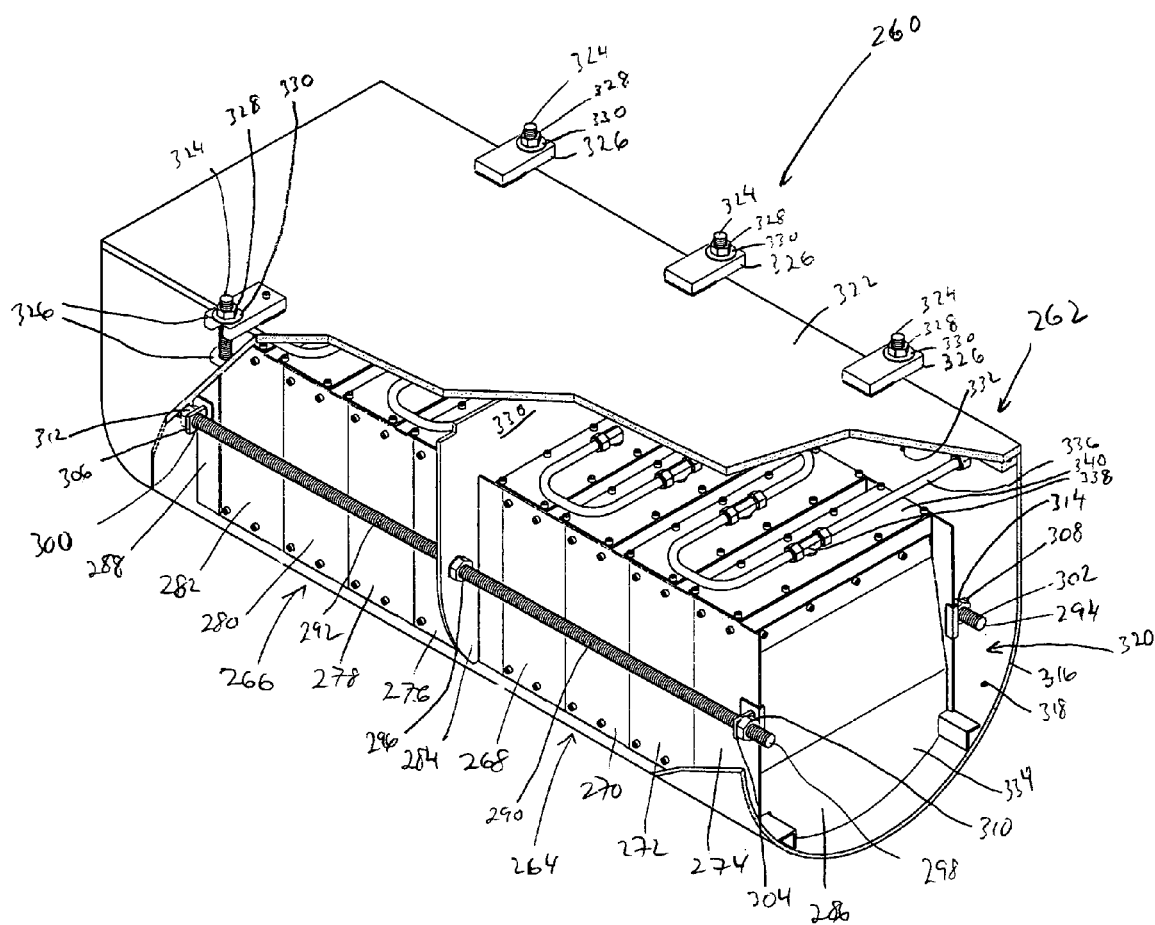
FIG. 6 is a perspective drawing illustrating a double-stage membrane contactor including eight hollow fiber membrane modules housed within a conduit.

The single stage 170 of modules 172-178 depicted in FIG. 5 may be configured within a single conduit along with one or more other stage(s) as shown in the partially-cutaway perspective drawing illustrated in FIG. 6. In particular, FIG. 6 illustrates a membrane contactor 260 having a single conduit 262, which encloses both a first stage 264 and a second stage 266. The conduit may be made of steel, stainless steel, or PVC. The first stage, similar to the stage depicted in FIG. 5, includes four modules 268, 270, 272, and 274. Also, the second stage includes an additional four modules 276, 278, 280, and 282. A first flow diversion assembly 284 is located between the first and second stages. A second flow diversion assembly 286 is located at the end of the first stage opposite the first flow diversion assembly. Similarly, a third flow diversion assembly 288 is located at the end of the second stage opposite the first flow diversion assembly. The first, second, and third flow diversion assemblies are used for directing the flow of the first fluid (not shown). In particular, the first flow diversion assembly is configured to direct the flow of the first fluid into the first stage, and direct the flow of the first fluid leaving the second stage. The second flow diversion assembly is configured to direct the flow of the first fluid leaving the first stage. The third flow diversion assembly is configured to direct the flow of the first fluid into the second stage.

Four bolts 290, 292, and 294 (only three shown) each have one end 296 (only one shown) connected to the first flow diversion assembly 284 and an opposite end 298, 300, and 302 (only three shown) that is inserted through a hole (not shown) in a bracket 304, 306, and 308 (only three shown) connected to one of the second and third flow diversion assemblies 286 and 288, respectively. Each of the bolts is secured in place by a corresponding nut 310, 312, and 314 (only three shown). Thus, the first flow diversion assembly is coupled to both the second and third flow diversion assemblies, the first stage 264 is located between the first and second flow diversion assemblies, and the second stage 266 is located between the first and third flow diversion assemblies.

While FIG. 6 illustrates a membrane contactor 260 having two stages 264 and 266, it should be understood that the membrane contactor could include only one stage, or more than two stages. Also, it should be understood that each stage need not include four modules 268-274, rather, each stage could include one or more modules. In fact, any number of modules could be configured in a side-by-side manner within each stage.

As illustrated in FIG. 6, the conduit 262 includes a curved plate 316 having an inner surface 318 which defines a channel 320, having a U-shaped cross-section, into which the first and second stages 264 and 266, respectively, are positioned. The conduit also includes a bulkhead plate 322, which is secured to the curved plate by bolts 324 that are inserted through brackets 326 connected to both the bulkhead and curved plate and secured in place with nuts 328 and washers 330. Accordingly, the combination of the curved and bulkhead plates provide for a sealed environment within which the first fluid (not shown) can flow. From FIG. 6, it can be seen that the first flow diversion assembly 284 includes a flat-edged upper portion 330 that interfaces with a surface 332 of the bulkhead plate and the inner surface of the curved plate. Also, each of the second and third flow diversion assemblies 286 and 288 includes a curved lower portion 334 (only one shown) that interfaces with the inner surface of the curved plate.

A pipe 336 is connected between a tube fitting 338 connected to a first end plate 340 of a module 274 in the first stage 264 and the inside surface 318 of the conduit 262. While not shown in FIG. 6, another pipe (not shown) is connected between a tube fitting (not shown) connected to the module's second end plate (not shown) and the inside surface of the conduit. Similarly, while not shown in FIG. 6, two pipes (not shown) interconnect tube fittings (not shown) connected to the first and second end plates (not shown) of a module 282 in the second stage 266. The interconnection of the tube fittings and the inside surface of the conduit allows for a second fluid (not shown) to be provided to the modules in the first and second stages from outside of the conduit. The second fluid that flows through the pipes that interconnect the second stage to the conduit may be the same as the second fluid or gas that flows through the modules of the first stage, or it may be a different fluid.

Figure 7:
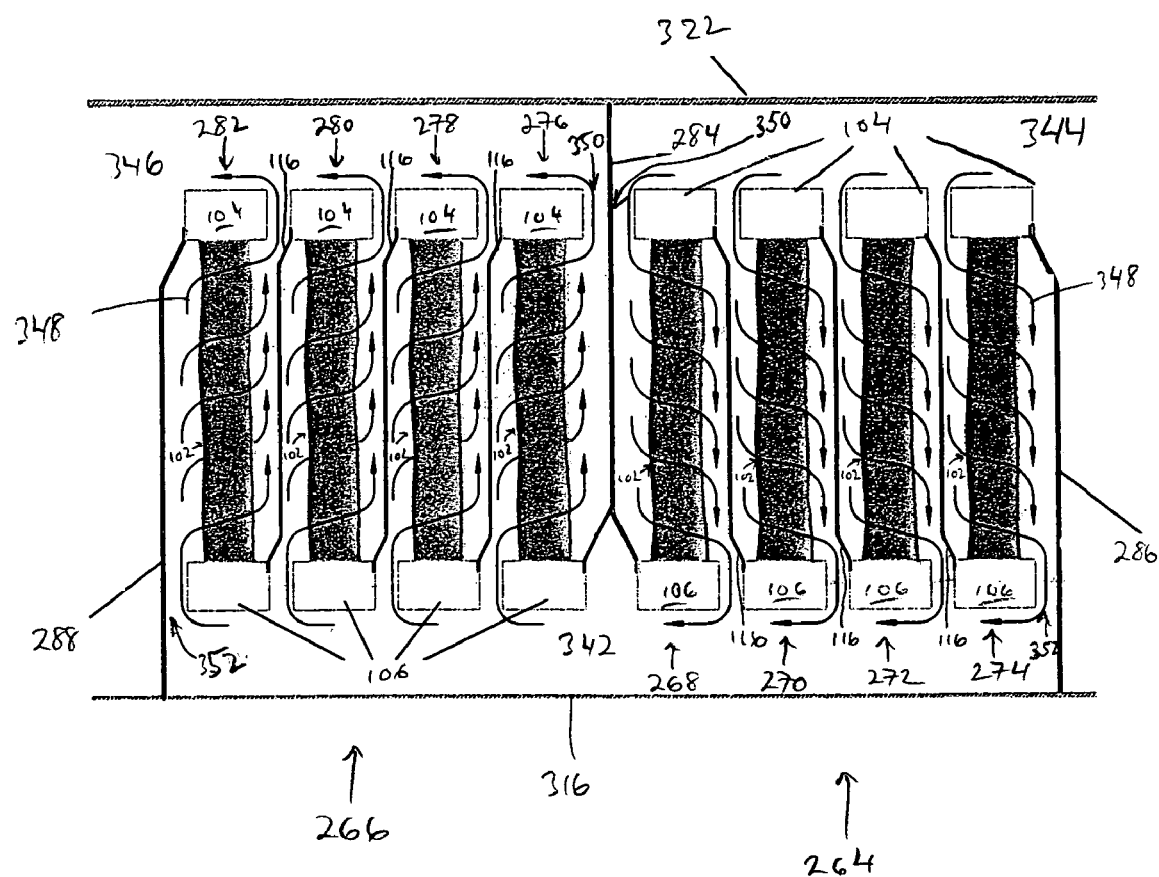
FIG. 7 is a cross-section drawing illustrating the flow of a fluid through the double-stage membrane contactor of FIG. 6.

FIG. 7 is a cross-sectional drawing of the membrane contactor 260 illustrated in FIG. 6, which depicts the modules 268-274 of the first stage 264 and the modules 276-282 of the second stage 266. Also, FIG. 7 depicts the bulkhead plate 322, curved plate 316, first flow diversion assembly 284, second and third flow diversion assemblies 286 and 288, respectively, flow diverters 116, pluralities of elongated hollow fiber membranes 102, and first and second membrane housings 104 and 106, respectively. As indicated in FIG. 7, a first space 342 exists between the first flow diversion assembly and the curved plate, respectively. In addition, a second space 344 and a third space 346 exist between the second and third flow diversion assemblies and the bulkhead plate.

In addition to the flow arrows 256 and 258 included in FIG. 5, the flow arrows 348 in FIG. 7 indicate the direction of the flow of the first fluid (not shown) through the second space 344, first openings 350 located adjacent to the first stage modules' first membrane housing 104, plurality of elongated hollow fiber membranes 102, and second openings 352 located adjacent to the second membrane housings 106 of the modules in the first stage 264. Next, the first fluid flows below the first stage's modules 268-274 and the first flow diversion assembly 284 through the first space 342 toward the second stage's modules 276-282. The first fluid then flows through the second openings located adjacent to the second membrane housings of the second stage's modules, plurality of elongated hollow fiber membranes, first openings located adjacent to the first membrane housings of the second stage's modules, and the third space 346. Thus, as shown in FIG. 7, the first fluid flows along a transverse path past the exterior surfaces 122 of the hollow fiber membranes in the modules of both the first and second stages.

Figure 8:
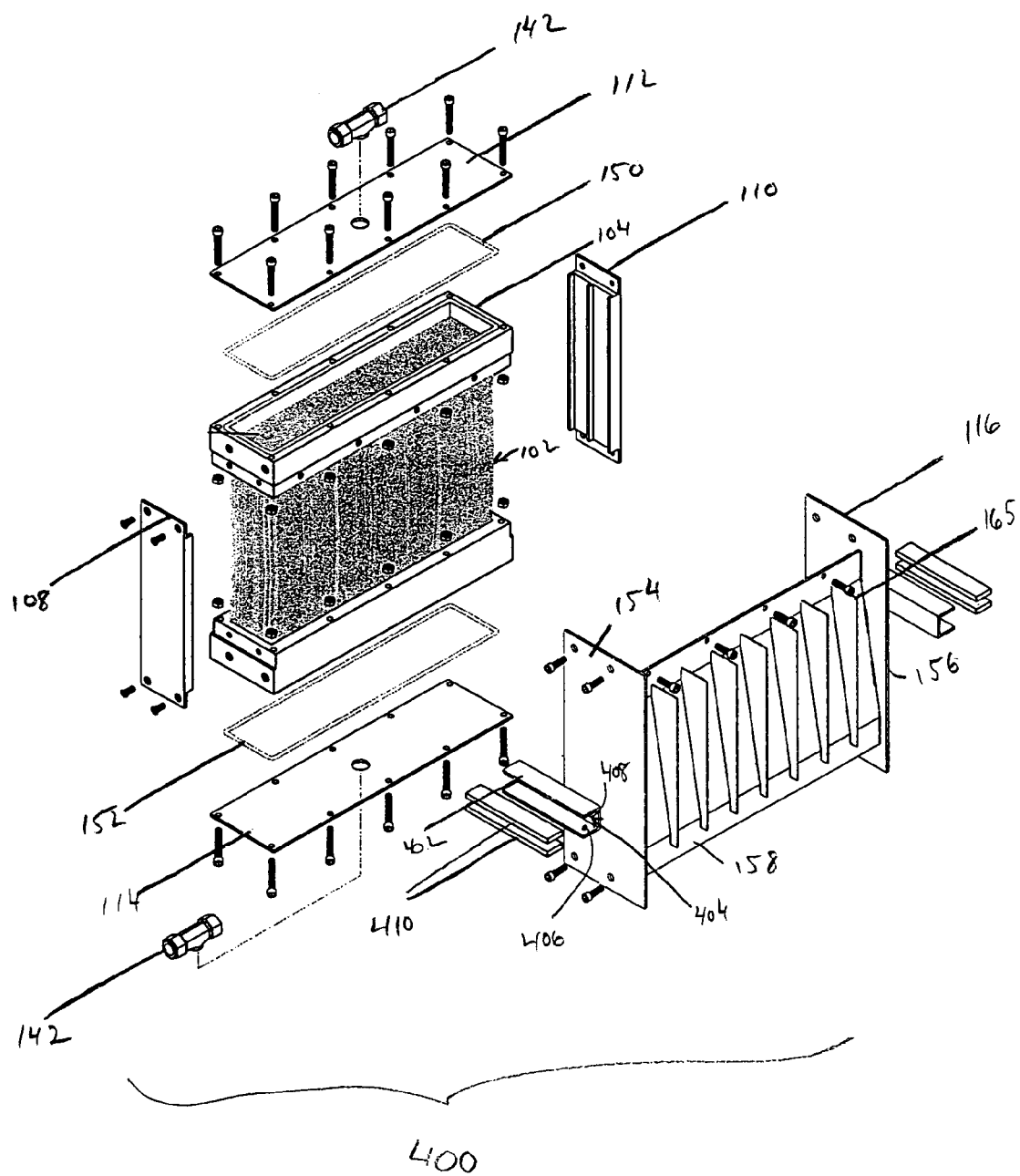
FIG. 8 is an exploded perspective drawing illustrating another embodiment of the hollow fiber membrane module including module guides.
Figure 9:
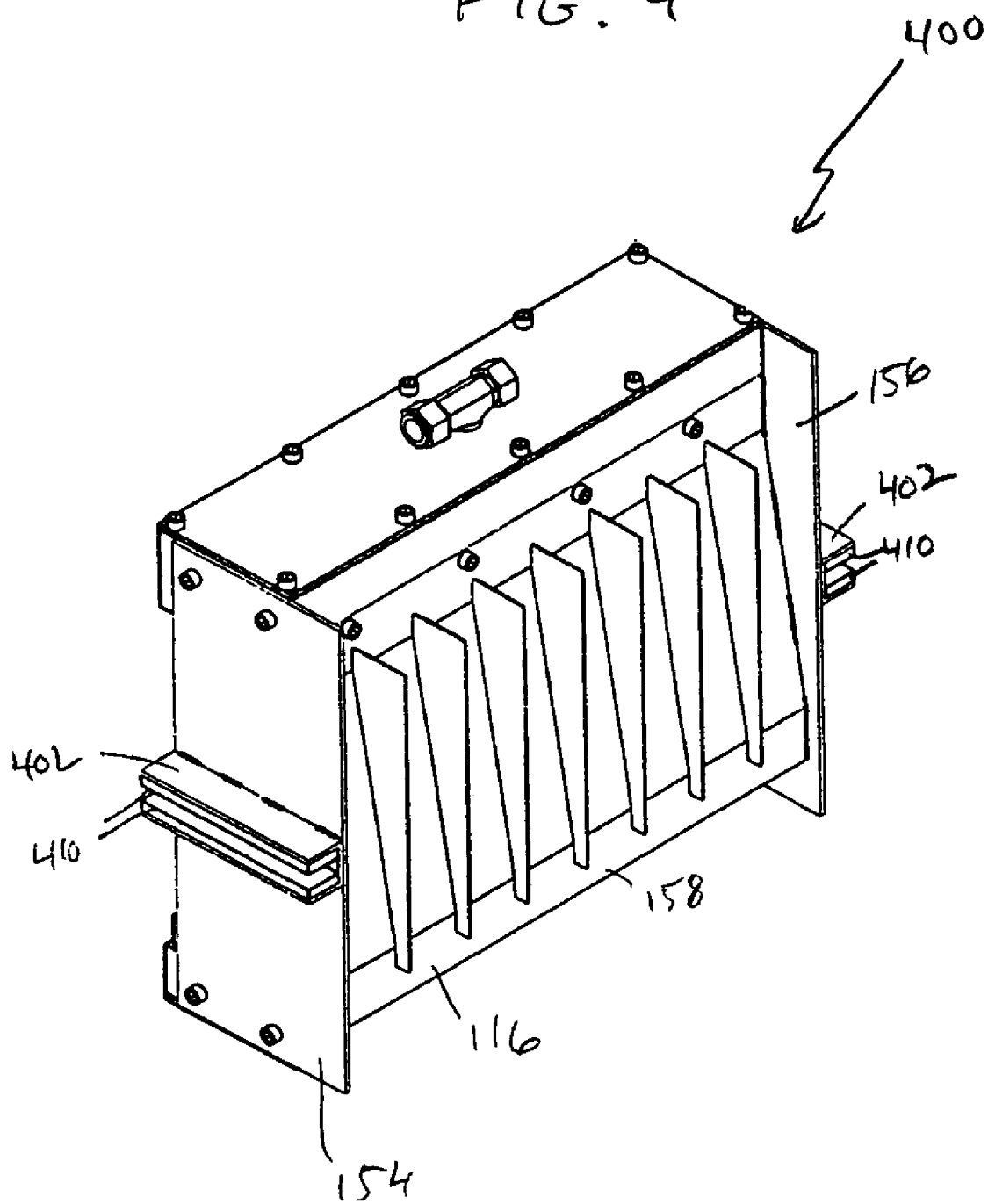
FIG. 9 is a perspective drawing illustrating the hollow fiber membrane module of FIG. 8 connected to a flow divider.

Another embodiment of the module 400 is illustrated in FIGS. 8 and 9, where the module is shown with a module guide 402 connected to each of the first and second plates 154 and 156 of the flow divider 116. Each module guide is generally U-shaped in cross section and defines a guide channel 404 having opposite surfaces 406 and 408. Two rectangular-shaped module guide runners 410 are inserted into each guide channel and connected to the opposite surfaces of the guide channel so the two module guide runners are located approximately parallel to one another. In preferred embodiments, each module guide is made of stainless steel and each module guide runner is made of polypropylene.

Figure 10:
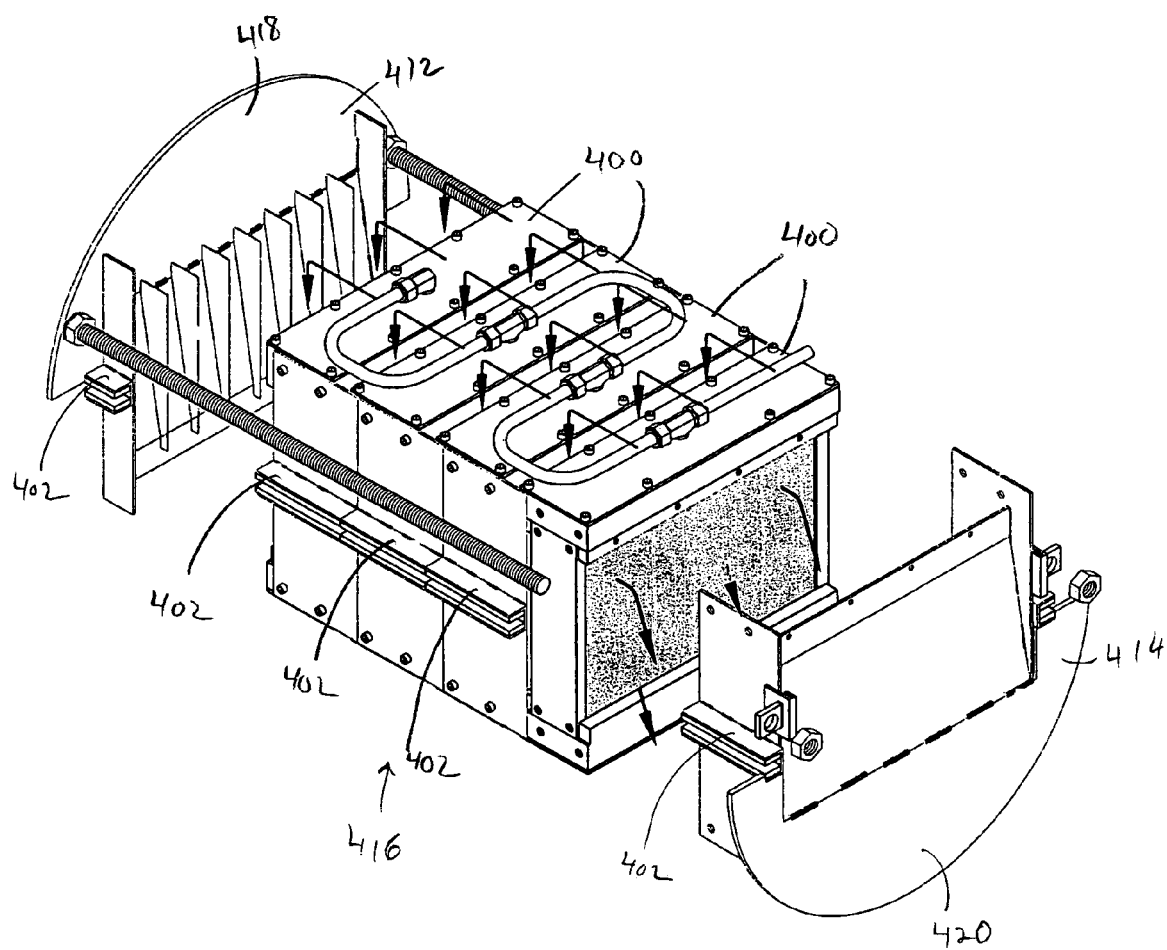
FIG. 10 is a partially-exploded perspective drawing illustrating a single-stage membrane contactor including four hollow fiber membrane modules having module guides.

FIG. 10 illustrates the embodiment of the module 400 shown in FIGS. 8 and 9 located between additional embodiments of the first flow diversion assembly 412 and second flow diversion assembly 414. In particular, FIG. 10 illustrates a single stage 416 including four modules located between the first flow diversion assembly and the second flow diversion assembly. By comparing FIGS. 5 and 10, it can be seen that the embodiment of the first flow diversion assembly illustrated in FIG. 10 includes a semicircular upper portion 418 and the second flow diversion assembly includes a semicircular lower portion 420. FIGS. 11 and 12 illustrate a single-stage membrane contactor 422 and a double-stage membrane contactor 424, respectively, including modules having module guides 402 and the first and second flow diversion assemblies having semicircular upper and lower portions, respectively.

Figure 13:
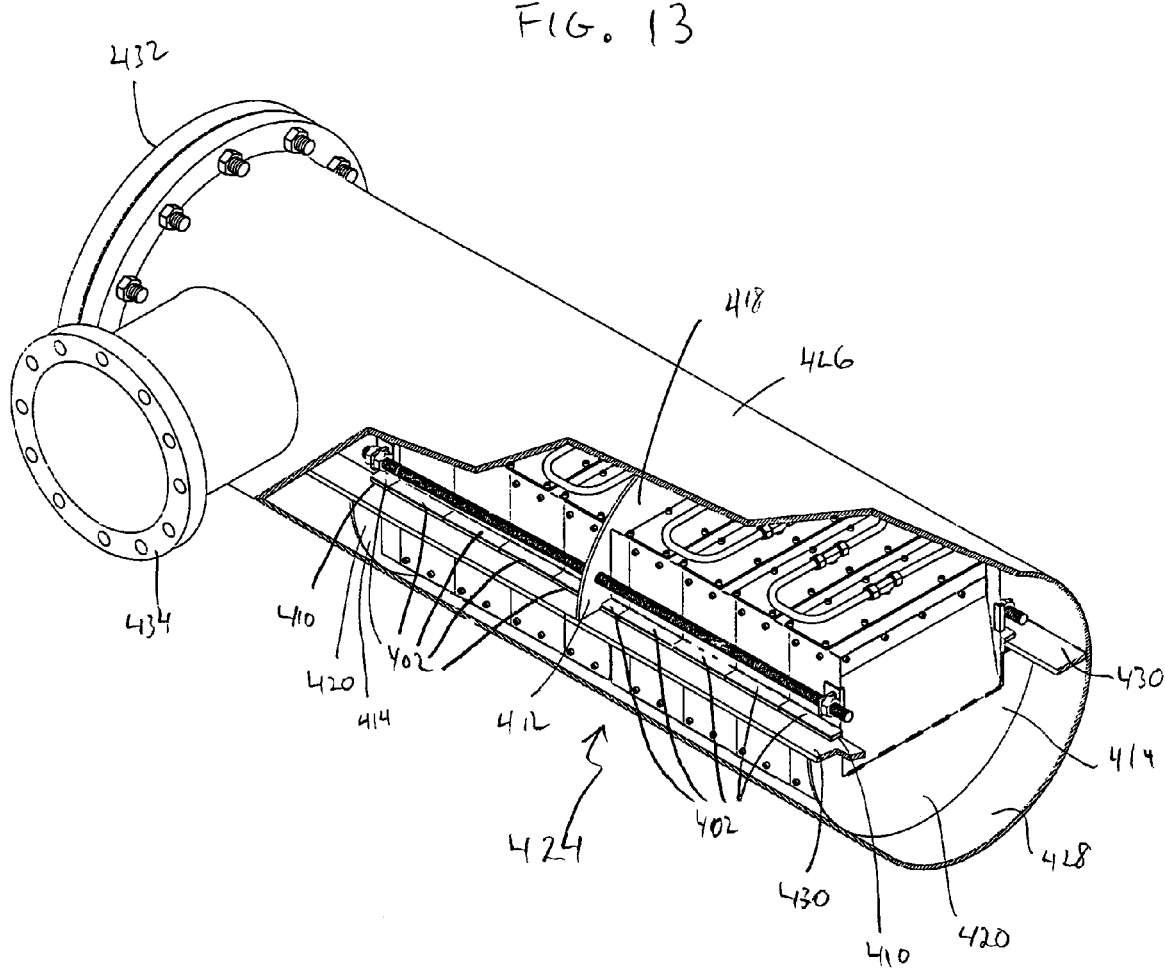
FIG. 13 is a cutaway perspective drawing illustrating the double-stage membrane contactor of FIG. 12 housed within a cylindrical pipe having an outlet port.
Figure 14:
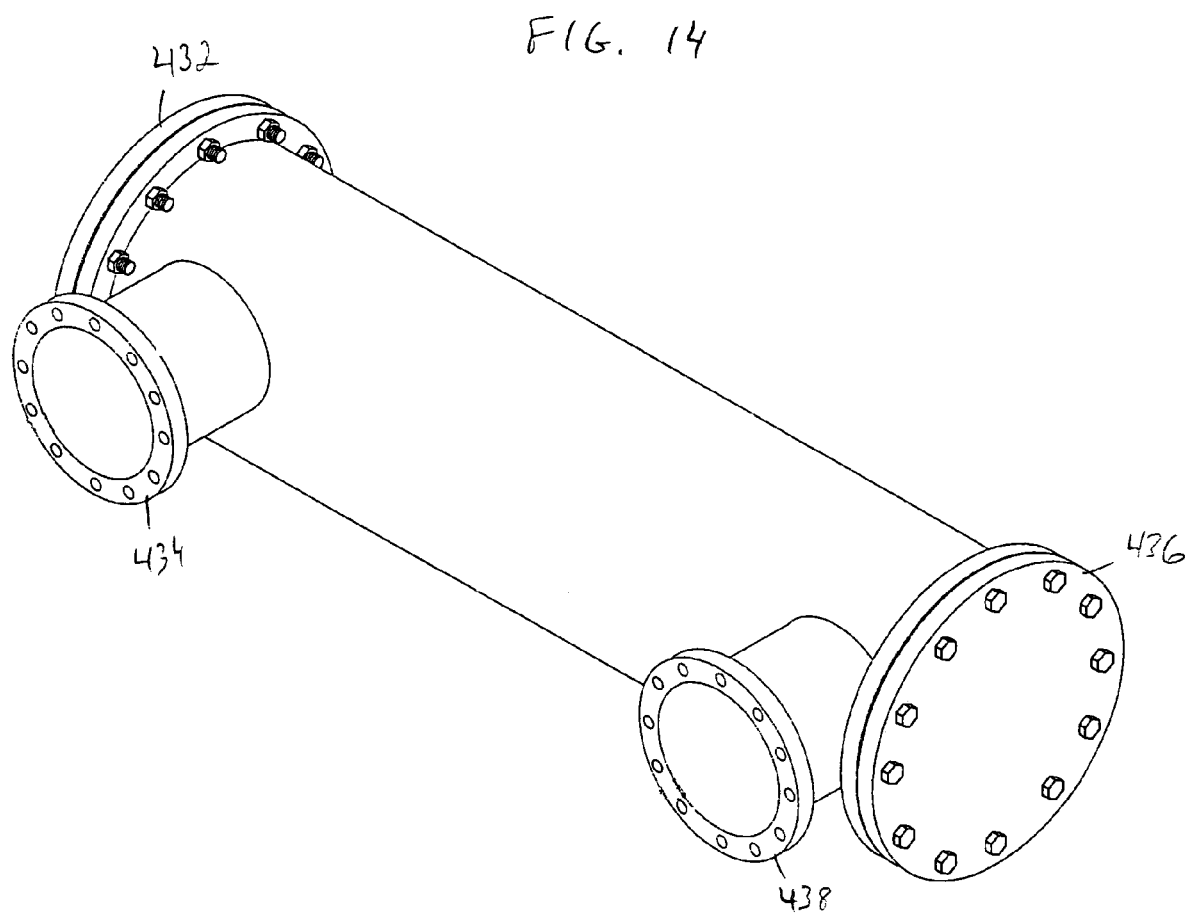
FIG. 14 is a perspective drawing illustrating a cylindrical pipe having both an inlet port and an outlet port.
Figure 15:
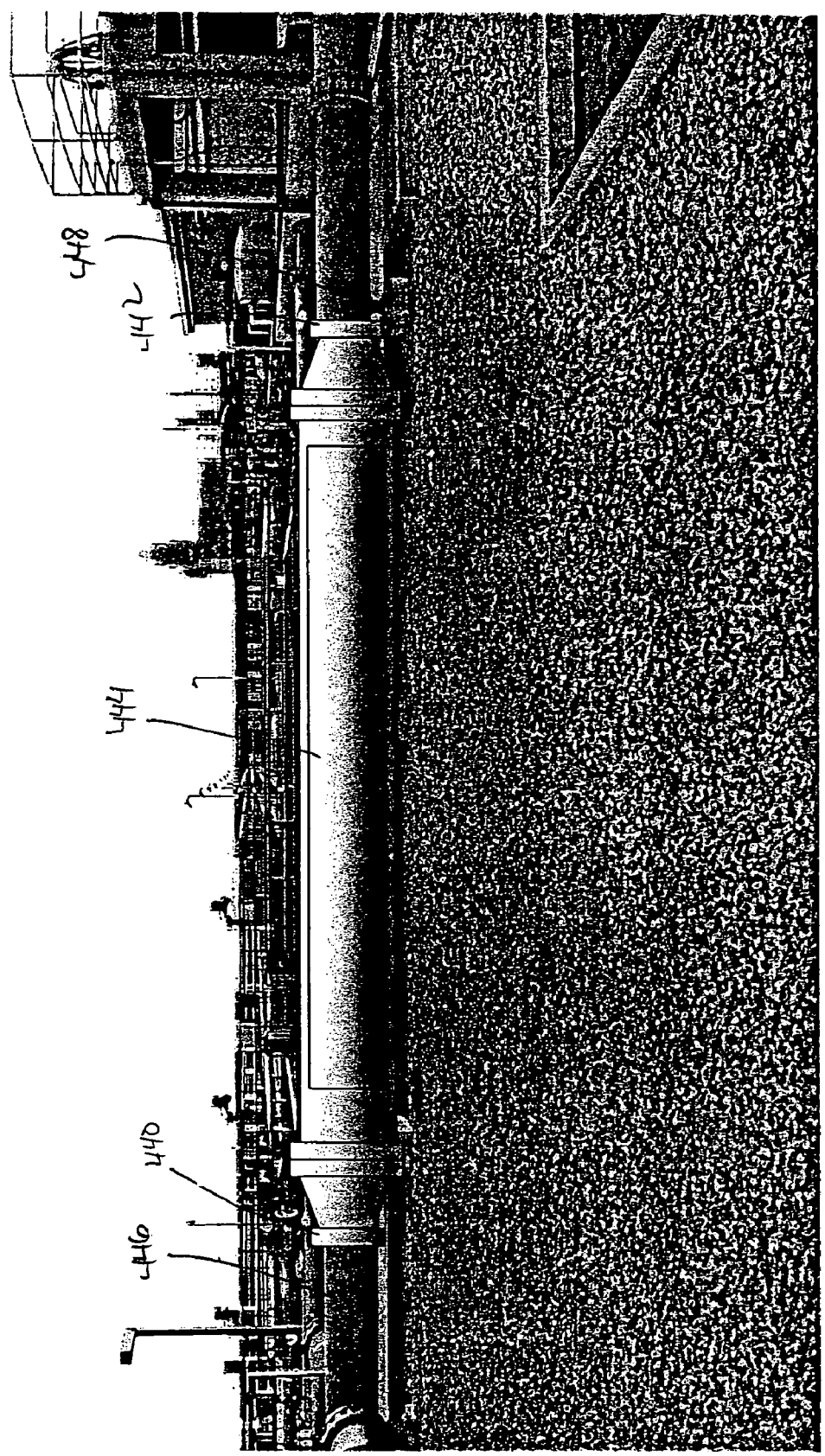
FIG. 15 is a photograph of a membrane contactor in an in-line configuration.

FIG. 13 a cutaway perspective drawing illustrating the double-stage membrane contactor 424 of FIG. 12 positioned within a conduit 426 in the shape of a cylindrical pipe. The cylindrical pipe has an inner surface 428 that includes opposite ribs 430 connected to the inner surface. The module guides 402, and their module guide runners 410, interface with the opposite ribs and secure each module 400 to the opposite ribs within the cylindrical pipe. Also, the semicircular upper and lower portions 418 and 420 of the first and second flow diversion assemblies 412 and 414, respectively, interface with the opposite ribs and the inner surface of the cylindrical pipe. While the cylindrical pipe in FIG. 13 is shown having one closed end 432 and an output port 434, the cylindrical pipe may be closed at both ends 432 and 436 and have both an input port 438 and an output port as shown in FIG. 14. Alternatively, the cylindrical pipe, or conduit, may be open at both ends 440 and 442 without an output port as shown in FIG. 15, which depicts a membrane contactor 444 in-line with other pipes 446 and 448 included in a processing facility. The membrane contactor includes an access opening (not shown), which is similar to the opening covered by the bulkhead plate 322 of FIG. 6, through which modules 100 can be removed.

Preferred embodiments of the membrane contactor 260 include modules 100 of three different sizes. The desired flow rate through the membrane contactor dictates the size of module required for a specific task. Referring to FIG. 3, one embodiment of the module is a small module, which has a width w of 9 inches, a height h of 11 inches, and a depth d of 2 inches. The small module offers a flow capacity of approximately 10 gallons per minute with an overall hollow fiber membrane surface area ranging from approximately 50 to approximately 100 square feet. Referring additionally to FIG. 7, the first and second rectangular openings 350 and 352, respectively, located adjacent to each small module's first and second membrane housings 104 and 106, respectively, are approximately 1 to 2 inches deep. Thus, a stage including ten small modules would have an overall depth ranging from approximately 30 to approximately 40 inches.

Another embodiment is a medium module 100, which has a width w of 14 inches, a height h of 13 inches, and a depth d of 3.5 inches. The medium module offers a flow capacity of approximately 50 gallons per minute with an overall hollow fiber membrane surface area ranging from approximately 250 to approximately 500 square feet. The first and second rectangular openings 350 and 352, respectively, located adjacent to the first and second membrane housings 104 and 106, respectively, are approximately 2 inches deep. Thus, a stage including ten medium modules would have an overall depth of approximately 55 inches.

An additional embodiment is a large module 100, which has a width w of 32 inches, a height h of 28 inches, and a depth d of 3.5 inches. The large module offers a flow capacity ranging from approximately 150 to approximately 250 gallons per minute with an overall hollow fiber membrane surface area ranging from approximately 1200 to approximately 2500 square feet. The first and second rectangular openings 350 and 352 located adjacent to the first and second membrane housings 104 and 106, respectively, are approximately 2 to 4 inches in depth. Thus, a stage including ten large modules could have an overall depth of approximately 75 inches.

Embodiments of the module 100 may be used to remove a gas or other dissolved material from a liquid outside of the plurality of elongated hollow fiber membranes 102. In one embodiment, the interior of each hollow fiber membrane is under vacuum, or a sweep gas, e.g., air or nitrogen, flows through the interior of the hollow fiber membrane. In this mode of operation, the pressure outside of each hollow fiber membrane may range to upwards of 150 to 200 pounds per square inch while the pressure inside of the hollow fiber membrane may be as low as 5 inches of Mercury. This mode of operation may be used to remove dissolved nitrogen and/or oxygen from water, dissolved air from water, dissolved ozone from water, volatile organic compounds from water, volatile inorganic compounds, e.g., hydrogen sulfide and radon gas, from water, ammonia from water, and chlorinated disinfection by-products, e.g., chloroform, from water.

Embodiments of the module 100 also may be used to add a gas to a liquid outside of the plurality of elongated hollow fiber membranes 102. In this mode of operation, the interior of each hollow fiber membrane is pressurized with the gas that is to be added to the liquid. This mode of operation can be used to add ozone to water, oxygen to water, and carbon dioxide to water.

In addition, embodiments of the module 100 may be used to remove selected molecules of a predetermined substance from a gas stream. In this mode of operation, a gas is outside of the plurality of elongated hollow fiber membranes 102 and a liquid stripping solution is circulated through the inside of the plurality of elongated hollow fiber membranes. This mode of operation can be used to selectively strip gases, such as carbon dioxide or hydrogen sulfide, from a gas stream.

Furthermore, embodiments of the module 100 may be used to remove non-volatile components from a liquid outside of the plurality of elongated hollow fiber membranes 102. A liquid stripping solution circulates through the interior of each hollow fiber membrane. This mode of operation can be used to remove dissolved copper from echant used in semiconductor manufacturing, or other inorganic ions, such as nitrate or perchlorate, from a solution.

One example of a membrane contactor 260 according to an embodiment of the present invention is designed to remove 95% of the methyl tert-butyl ether (MTBE) from a solution in a 250 gallon per minute stream. Accommodating the 250 gallons per minute flow rate requires that at least five 50 gallon per minute flow rate modules 100 (medium modules) be configured within a single stage 170. Also, if five modules are used in each stage, and assuming only a 60% removal rate of MBTE in each stage, four series-connected stages are required to achieve the goal of 95% removal of the MBTE. Therefore, the membrane contactor would require twenty medium-sized modules.

The embodiments of the present invention are advantageous because they offer a membrane contactor 260 that is inexpensive to manufacture because it is made from readily-available and/or easy to fabricate components. Also, the membrane contactors include a plurality of elongated hollow fiber membranes 102 having a large surface area, which facilitate high flow, approximately twenty times the flow of conventional processes having an equal physical size. In addition, embodiments can be used directly in-line with existing processing systems. Furthermore, embodiments of the present invention provide a low hydraulic pressure drop (<5 psi) across the modules 100.

Because of the modular design, embodiments of the present invention advantageously can be reconfigured to meet different specifications. In particular, any number of modules 100 can be stacked side-by-side. The modules can be configured within a single stage 170, within which the modules operate in parallel, or can be configured in multiple stages, which operate in series. Also, multiple stages can be configured within a single conduit 262, 426. In addition, the membrane contactor 260 could include one or more stages for modifying the concentration of a first predetermined substance, and another one or more stage for modifying the concentration of a second predetermined substance. For example, hollow fiber membranes 102 in a first stage can operate under vacuum to remove a substance A from a fluid, while hollow fiber membranes in a second stage can operate under pressure to add a substance B to the fluid. Furthermore, as a result of their modular design, individual modules can be removed, cleaned, and replaced as needed.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. An apparatus for modifying the concentration of a predetermined substance present in a first fluid flowing through a conduit having an inner surface and a longitudinal axis, the apparatus comprising:
   a first plurality of hollow fiber membrane modules, each module including:
      a plurality of elongated hollow fiber membranes located generally in adjacent, parallel relationship to each other, wherein each of the hollow fiber membranes includes a generally cylindrical wall defining an interior surface and an exterior surface, and further defining a first end and a second end, wherein each of the cylindrical walls is configured to transmit the predetermined substance therethrough, between its interior surface and its exterior surface, and
      a module housing that supports the plurality of elongated hollow fiber membranes with their first ends arranged in adjacent relationship and with their second ends arranged in adjacent relationship, wherein a transverse flow path is defined past the exterior surfaces of the hollow fiber membranes,
      wherein the first plurality of hollow fiber membrane modules are located within the conduit and mated with each other, in alignment along the longitudinal axis thereof;
   a second plurality of hollow fiber membrane modules located within the conduit and mated with each other, in alignment along the longitudinal axis thereof and downstream of the first plurality of hollow fiber membrane modules, wherein each module of the second plurality of modules is substantially the same as the modules of the first plurality of modules;
   a baffle assembly located within the conduit and configured to direct the flow of the first fluid initially to the first plurality of hollow fiber membrane modules, where the fluid flows along parallel flow paths simultaneously through such modules, and thereafter along a common path to the second plurality of hollow fiber membrane modules, where the fluid flows along parallel flow paths simultaneously through such modules, wherein in each case the fluid flows through the module along the transverse flow path past the exterior surfaces of the plurality of elongated hollow fiber membranes; and
   a fluid source that delivers a second fluid to the plurality of elongated hollow fiber membranes of each module of the first and second plurality of hollow fiber membrane modules and that directs the second fluid to flow through each hollow fiber membrane, from its first end to its second end;
   wherein the predetermined substance is transmitted through the cylindrical walls of the plurality of elongated hollow fiber membranes of each hollow fiber membrane module, to modify the concentration of the predetermined substance in the first fluid.

2. The apparatus according to claim 1, wherein the hollow fiber membranes are made of a material selected from the group comprising polypropylene, polyvinylidene fluoride, and Teflon®.

3. The apparatus according to claim 1, wherein the conduit is a cylindrical pipe.

4. The apparatus according to claim 1, wherein the module housing of each module of the first and second pluralities of hollow fiber membrane modules comprises:
   a first membrane housing located adjacent to the first ends of the hollow fiber membranes that is coupled to the first ends of the hollow fiber membranes;
   a first end plate located adjacent to the first ends of the hollow fiber membranes and connected to the first membrane housing;
   a second membrane housing located adjacent to the second ends of the hollow fiber membranes that is coupled to the second ends of the hollow fiber membranes;
   a second end plate located adjacent to the second ends of the hollow fiber membranes and connected to the second membrane housing; and
   a first side support connected between the first membrane housing and the second membrane housing that maintains a position of the first membrane housing relative to the second membrane housing.

5. The apparatus according to claim 4, wherein the module housing of each module of the first and second pluralities of hollow fiber membrane modules further comprises a second side support connected between the first membrane housing and the second membrane housing.

6. The apparatus according to claim 4, wherein the module housing of each module of the first and second pluralities of hollow fiber membrane modules further comprises a material that fills spaces between the first ends of the hollow fiber membranes, couples the first ends of the hollow fiber membranes to the first membrane housing, fills other spaces between the second ends of the hollow fiber membranes, and couples the second ends of the hollow fiber membranes to the second membrane housing.

7. The apparatus according to claim 6, wherein the material is selected from the group comprising epoxy, silicon, and urethane.

8. The apparatus according to claim 4, wherein the module housing of each module of the first and second pluralities of hollow fiber membrane modules further comprises:
   a first O-ring positioned between the first membrane housing and the first end plate before the first end plate is secured to the first membrane housing that provides a first seal between the first membrane housing and the first end plate; and
   a second O-ring positioned between the second membrane housing and the second end plate before the second end plate is secured to the second membrane housing that provides a second seal between the second membrane housing and the second end plate.

9. The apparatus according to claim 4, wherein the module housing of each module of the first and second pluralities of hollow fiber membrane modules further comprises:
   a first tube fitting connected to the first end plate; and
   a second tube fitting connected to the second end plate.

10. The apparatus according to claim 4, wherein the baffle assembly includes a flow divider connected to the first membrane housing of each module of the first and second pluralities of hollow fiber membrane modules, to direct the flow of the first fluid after the first fluid flows past the hollow fiber membranes of such module.

11. The apparatus according to claim 4, wherein the baffle assembly comprises:
a separate input flow diversion assembly located adjacent to each module of the first and second pluralities of hollow fiber membrane modules, each such input flow diversion assembly configured to direct the flow of the first fluid into the associated hollow fiber membrane module; and
a separate output flow diversion assembly located adjacent to each module of the first and second pluralities of hollow fiber membrane modules, with each module located between its associated input output flow diversion assemblies, wherein each output flow diversion assembly is configured to direct the flow of the first fluid leaving its associated hollow fiber membrane module.

12. The apparatus according to claim 11, wherein:
each of the input flow diversion assemblies includes an upper portion configured to interface with the inner surface of the conduit; and
each of the output flow diversion assemblies includes a lower portion configured to interface with the inner surface of the conduit.

13. The apparatus according to claim 11, wherein each module of the first and second pluralities of hollow fiber membrane modules further includes a flow divider connected to the module's first membrane housing and configured to direct the flow of the first fluid after the first fluid flows past the module's hollow fiber membranes.

14. The apparatus according to claim 13, wherein each module of the first and second pluralities of hollow fiber membrane modules further includes a module guide connected to the associated flow divider.

15. The apparatus according to claim 14, wherein:
the conduit includes a rib connected to its inner surface; and
the module guide of each module of the first and second pluralities of hollow fiber membrane modules interfaces with the rib.

16. The apparatus according to claim 1, wherein one hollow fiber membrane module of the first plurality of hollow fiber membrane modules further includes a flow divider connected to the one hollow fiber membrane module that directs the flow of the first fluid after the first fluid flows past the hollow fiber membranes of the one hollow fiber membrane module.

17. The apparatus according to claim 1, further comprising:
a first flow diversion assembly located adjacent to the first plurality of hollow fiber membrane modules and configured to direct the flow of the first fluid into the first plurality of hollow fiber membrane modules; and
a second flow diversion assembly located adjacent to the first plurality of hollow fiber membrane modules, with the first plurality of hollow fiber membrane modules located between the first flow diversion assembly and the second flow diversion assembly, wherein the second flow diversion assembly is configured to direct the flow of the first fluid leaving the first plurality of hollow fiber membrane modules toward the second plurality of hollow fiber membrane modules.

18. An apparatus for modifying the concentration of a predetermined substance present in a first fluid flowing through a conduit having an inner surface, the apparatus comprising:
a first hollow fiber membrane module including
a plurality of elongated hollow fiber membranes located generally in adjacent, parallel relationship to each other, wherein each of the hollow fiber membranes includes a generally cylindrical wall defining an interior surface and an exterior surface, and further defining a first end and a second end, wherein each of the cylindrical walls is configured to transmit the predetermined substance therethrough, between its interior surface and its exterior surface, and
a module housing that supports the plurality of elongated hollow fiber membranes with their first ends arranged in adjacent relationship and with their second ends arranged in adjacent relationship, wherein a transverse flow path is defined past the exterior surfaces of the hollow fiber membranes, wherein the module housing includes
a first membrane housing located adjacent to the first ends of the hollow fiber membranes that is coupled to the first ends of the hollow fiber membranes,
a first end plate located adjacent to the first ends of the hollow fiber membranes and connected to the first membrane housing,
a second membrane housing located adjacent to the second ends of the hollow fiber membranes that is coupled to the second ends of the hollow fiber membranes,
a second end plate located adjacent to the second ends of the hollow fiber membranes and connected to the second membrane housing, and
a first side support connected between the first membrane housing and the second membrane housing that maintains a position of the first membrane housing relative to the second membrane housing,
wherein the first hollow fiber membrane module is configured to be positionable within the conduit and further to be matable with a similarly configured hollow fiber membrane module;
a baffle assembly located within the conduit and including a flow divider connected to the first membrane housing that directs the flow of the first fluid through the first hollow fiber membrane module, along the transverse flow path past the exterior surfaces of the plurality of elongated hollow fiber membranes, wherein the flow divider includes a plurality of flow vanes; and
a fluid source that directs a second fluid to flow through the plurality of elongated hollow fiber membranes, from their first ends to their second ends;
whereby the predetermined substance is transmitted through the cylindrical walls of the plurality of elongated hollow fiber membranes, to modify the concentration of the predetermined substance in the first fluid.

19. An apparatus for modifying the concentration of a predetermined substance present in a first fluid flowing through a conduit having an inner surface, the apparatus comprising:
a first hollow fiber membrane module including
a plurality of elongated hollow fiber membranes located generally in adjacent, parallel relationship to each other, wherein each of the hollow fiber membranes includes a generally cylindrical wall defining an interior surface and an exterior surface, and further defining a first end and a second end, wherein each of the cylindrical walls is configured to transmit the predetermined substance therethrough, between its interior surface and its exterior surface, and a module housing that supports the plurality of elongated hollow fiber membranes with their first ends arranged in adjacent relationship and with their second ends arranged in adjacent relationship, wherein a transverse flow path is defined past the exterior surfaces of the hollow fiber membranes, wherein the module housing includes
  a first membrane housing located adjacent to the first ends of the hollow fiber membranes that is coupled to the first ends of the hollow fiber membranes,
  a first end plate located adjacent to the first ends of the hollow fiber membranes and connected to the first membrane housing,
  a second membrane housing located adjacent to the second ends of the hollow fiber membranes that is coupled to the second ends of the hollow fiber membranes,
  a second end plate located adjacent to the second ends of the hollow fiber membranes and connected to the second membrane housing, and
  a first side support connected between the first membrane housing and the second membrane housing that maintains a position of the first membrane housing relative to the second membrane housing,
  wherein the first hollow fiber membrane module is configured to be positionable within the conduit and further to be matable with a similarly configured hollow fiber membrane module;
a baffle assembly located within the conduit and including a flow divider connected to the first membrane housing and a module guide connected to the flow divider, for directing the flow of the first fluid through the first hollow fiber membrane module, along the transverse flow path past the exterior surfaces of the plurality of elongated hollow fiber membranes; and
a fluid source that directs a second fluid to flow through the plurality of elongated hollow fiber membranes, from their first ends to their second ends;
whereby the predetermined substance is transmitted though the cylindrical walls of the plurality of elongated hollow fiber membranes, to modify the concentration of the predetermined substance in the first fluid.

20. The apparatus according to claim 19, further comprising a module guide runner connected to the module guide.

21. The apparatus according to claim 19, wherein:
the conduit includes a rib connected to the inner surface; and
the module guide interfaces with the rib.

22. An apparatus for modifying the concentration of a predetermined substance present in a first fluid flowing through a conduit having an inner surface, the apparatus comprising:
a first stage and an adjacent second stage through which the first fluid flows, wherein each of the first stage and the second stage includes a hollow fiber membrane module including:
  a plurality of elongated hollow fiber membranes located generally in adjacent, parallel relationship to each other, wherein each of the hollow fiber membranes includes a generally cylindrical wall defining an interior surface and an exterior surface, and further defining a first end and a second end, wherein each of the cylindrical walls is configured to transmit the predetermined substance therethrough, between its interior surface and its exterior surface, and
  a module housing that supports the plurality of elongated hollow fiber membranes with their first ends arranged in adjacent relationship and with their second ends arranged in adjacent relationship, wherein a transverse flow path is defined past the exterior surfaces of the hollow fiber membranes,
  wherein the hollow fiber membrane module is configured to be positionable within the conduit and further to be matable with a similarly configured hollow fiber membrane module;
a first flow diversion assembly located within the conduit between the first and second stages and configured to direct the flow of the first fluid into the first stage and direct the flow of the first fluid leaving the second stage;
a second flow diversion assembly located within the conduit adjacent to the first stage, with the first stage located between the first flow diversion assembly and the second flow diversion assembly, wherein the second flow diversion assembly is configured to direct the flow of the first fluid leaving the first stage;
a third flow diversion assembly located within the conduit and adjacent to the second stage, with the second stage located between the first flow diversion assembly and the third diversion assembly, wherein the third flow diversion assembly is configured to direct the flow of the first fluid into the second stage; and
a fluid source that delivers a second fluid to the plurality of elongated hollow fiber membranes and that directs the second fluid to flow through each such hollow fiber membrane, from its first end to its second end;
whereby the predetermined substance is transmitted through the cylindrical walls of the plurality of elongated hollow fiber membranes, to modify the concentration of the predetermined substance in the first fluid as the first fluid flows past the exterior surfaces of the plurality of elongated hollow fiber membranes.

23. The apparatus according to claim 22, wherein:
the first flow diversion assembly includes an upper portion;
each of the second flow diversion assembly and the third flow diversion assembly includes a lower portion; and
the upper portion and the lower portions are designed to interface with the inner surface of the conduit.

24. The apparatus according to claim 22, further comprising a module guide connected to the hollow fiber membrane module in each of the first stage and the second stage.

25. The apparatus according to claim 24, wherein:
the conduit includes a rib connected to the inner surface; and
the module guide interfaces with the rib.

* * * * *